United States Patent Office 3,631,185
Patented Dec. 28, 1971

3,631,185
SYNTHESIS OF 2,4,6-TRI-t-BUTYL-4-METHOXY-CYCLOHEXA-2,5-DIEN-1-ONE
Robert J. Laufer, Colts Neck, N.J., assignor to Consolidation Coal Company, Pittsburgh, Pa.
No Drawing. Filed Apr. 10, 1970, Ser. No. 27,456
Int. Cl. C07c 49/44
U.S. Cl. 260—396 N            6 Claims

ABSTRACT OF THE DISCLOSURE

The compound 2,4,6-tri-t-butyl-4-methoxycyclohexa-2,5-dien-1-one, having the following structural formula

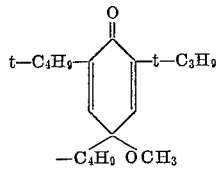

is synthesized in one step by reacting 2,4,6-tri-t-butylphenol, bromine, methanol and an alkali metal carbonate at a temperature within the range 20 to 80° C. The product compound having the above formula is produced in 65 percent or better yield. It is useful as an intermediate in the preparation of 2,6-di-t-butyl-4-methoxyphenol or 2-t-butyl-4-methoxyphenol, both of which are useful as antioxidants, the former in non-food uses and the latter in foods.

BACKGROUND OF THE INVENTION

(1) Field of the invention

This invention relates to the synthesis of 2,4,6-tri-t-butyl-4-methoxycyclohexa-2,5-dien-1-one, a compound having the following structural formula:

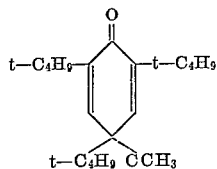

(2) Description of the prior art

The compounds 2-t-butyl-4-methoxyphenol (II) and 2,6-di-t-butyl-4-methoxyphenol (III) are well-known phenolic antioxidants for food and non-foods respectively. Most syntheses for making these compounds start with hydroquinone which now sells for about 80¢/lb.

The compound 2,6-di-t-butylphenol (IV) is also a well-known antioxidant. It is generally prepared by the butylation of phenol. The by-products of this butylation include 2,4,6-tri-t-butylphenol (V) which has no commercial market.

Compound (I) may be readily converted to either 2-t-butyl-4-methoxyphenol (II) or 2,6-di-t-butyl-4-methoxyphenol (III) by simple pyrolysis. It would be commercially advantageous if the by-product 2,4,6-tri-t-butylphenol (V) could be converted to Compound (I) which would then serve as an intermediate for preparing the aforementioned antioxidants.

Müller and Ley (Chem. Ber. 88, 601–614 [1955]) describe the conversion of 2,4,6-tri-t-butylphenol (V) to Compound (I) in two steps. In the first step, the 2,4,6-tri-t-butylphenol is converted to the bromocyclohexadienone derivative in 95 percent yield by treating a suspension of the phenol in acetic acidmethanol with bromine at −10° C. In the second step, the bromocyclohexadienone is converted to the Compound (I) by heating the dienone in methanolic KOH. This two-step synthesis may be illustrated as follows:

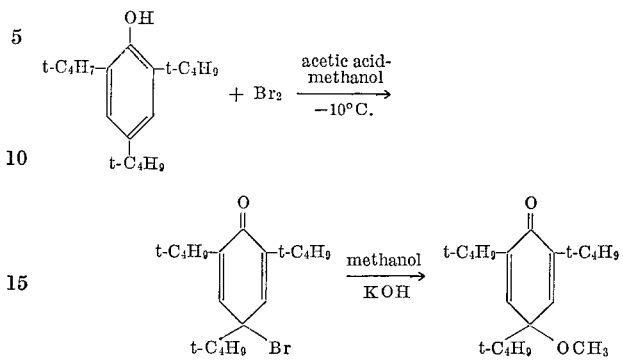

The primary object of the present invention is to replace the two-step synthesis of Müller and Ley by a commercially feasible one-step synthesis.

SUMMARY OF THE INVENTION

In accordance with the present invention, a one-step synthesis of 2,4,6-tri-t-butyl-4-methoxycyclohexa-2,5-dien-1-one is provided which comprises reacting 2,4,6-tri-t-butylphenol, bromine, methanol and an alkali metal carbonate in stoichiometric relationship to each other at a temperature between 20 and 80° C. Pressure has little or no effect. The desired product may be recovered in pure form from the reaction product and then converted to a phenolic antioxidant; or it may be converted, without separation, to the desired phenolic antioxidant.

Preferably, the reaction is conducted by mixing 2,4,6-tri-t-butylphenol and an alkali metal carbonate in methanol to form a slurry. The slurry is stirred while bromine is added at a rate which permits maintenance of the temperature between 20 and 80° C. Preferably, 1.0 to 1.2 moles of the carbonate (generally sodium carbonate) per mole of 2,4,6-tri-t-butylphenol is used. At least that much methanol is also used, and generally more since methanol also serves as a solvent. At least 1 mole of bromine per mole of the phenol is required to complete the reaction. The time required to complete the reaction is a function of the temperature, but is generally from one to five hours.

DESCRIPTION OF PREFERRED EMBODIMENT

A stirred slurry of 263 grams (one mole) of recrystallized powdered 2,4,6-tri-t-butylphenol, 117 grams (1.1 mole) of anhydrous $Na_2CO_3$, and 750 milliliters of $CH_3OH$ was treated with 168 grams (1.05 mole) of bromine, added dropwise over 55 minutes. The temperature was permitted to rise autogenously from an initial 21.5° C. to 51° C. at the end of the bromine addition. The mixture was maintained at 50° C. for 48 minutes; then was heated to reflux until gas ($CO_2$) evolution ceased (26 minutes, final temperature 67° C.). The hot $CO_2$-free mixture was cooled to 50° C. and filtered. Methanol was removed from the filtrate to a pot temperature of 100° C. under reduced pressure (by means of a water aspirator). The residual oil and the filter cake were dissolved in 300 milliliters of water and 250 milliliters of hexane. The alkaline aqueous phase was discarded; and the hexane phase was washed twice with 100-milliliter portions of water. Removal of hexane in vacuo to 110° C. yielded 288 grams of crude product, a pale green oil which solidified on cooling to a hard green-yellow solid, melting point 45.0–52.5° C. Recrystallization of a 284-gram portion of the crude product from 250 milliliters of warm 95 percent ethanol yielded 255 grams of pure product which consisted of pale yellow crystals, melting point 54.0°–57.0° C. Analysis confirmed this product to be 2,4,6-tri-t-butyl-4-methoxycyclohexa-2,5-dien-1-one (I). The yield of pure product was 87 percent, calculated as percent of theory based on tri-t-butylphenol charged.

CONVERSION OF COMPOUND (I) TO ANTIOXIDANTS (A) Compound (I) may be recovered in substantially pure form and then converted to phenolic antioxidants, as follows:

A flask containing 180 grams of the purified methoxydienone (I) was attached to a ¾" x 24" Vigreaux distillation column which was vented to a wet-test meter. The dienone was heated at a moderate rate. Gas evolution commenced near 190° C. The temperature was gradually raised to 250° C. over one-half hour, by which time the rate of gas generation had begun to decline. After an additional 12 minutes at 250° C., the reaction product was cooled under nitrogen. Formaldehyde could easily be detected by odor in the off-gas. Distillation of the pyrolysate at 135–140°/10 mm. to a pot temperature of 205° C. yielded 131 grams of a distillate which was a readily crystallizable yellow oil. The resinous residue weighed 5.8 grams.

The total distillate was dissolved in 120 milliliters of boiling methanol, and 15 milliliters of water were added at the boiling point. The solution was cooled slowly with occasional stirring. After several hours in an ice-water bath, the crystal slurry was filtered and the cake washed with very cold aqueous methanol to yield, on drying, 92.7 grams of colorless prisms of 2,6-di-t-butyl-4-methoxyphenol (III), melting point 102°–104° C.

Methanol was removed in vacuo from the filtrates and the organic matter extracted with 50 milliliters of hexane. The hexane solution was contacted successively with three separate batches of 50 milliliters of methanolic caustic (20 grams NaOH, 18 grams $H_2O$, 162 grams $CH_3OH$) at room temperature. The combined caustic extracts were extracted twice with 50 milliliters of hexane; then were acidified with hydrochloric acid. The caustic-insoluble and caustic-soluble portions, as well as material removed by hexane-washing of the caustic phases, were recovered and analyzed by gas chromatography. The major component in the caustic-insoluble phase (79%) was shown to be 2,4,6-tri-t-butylphenol (V) by melting point and by analysis.

Yields of the major products of the conversion were:

| | Percent of theory |
|---|---|
| 2,6-di-t-butyl-4-methoxyphenol (III) | 69.2 |
| 2-t-butyl-4-methoxyphenol (II) | 12.3 |
| 2,3-di-t-butylphenol | 8.6 |
| 2,4,6-tri-t-butylphenol (V) | 3.2 |
| | 93.3 |

(B) Compound (I) may also be made and then, without separation, be directly converted by pyrolysis to phenolic antioxidants, as follows:

A 12-liter reaction flask was fitted with a stirrer, heating mantle, thermometer, reflux condenser, and dropping funnel. The flask was charged with 1640 grams of pure, pulverized 2,4,6-tri-t-butylphenol, 850 grams of sodium carbonate monohydrate, 4700 milliliters of methanol, and 626 milliliters of water. To the slurry, initially at 20° C., was added 1060 grams of bromine over a 50-minute period. The temperature rose autogenously in the insulated flask to 44° C. The reflux condenser was replaced with a distillation assembly and atmospheric distillation carried out over four hours to a final pot temperature of 80° C. A total of 4010 milliliters of pale yellow distillate was collected.

The residue was treated with 1875 milliliters of cold water and 1500 milliliters of hexane. The upper, hexane phase was washed twice with 1250 milliliters of water. The clear, deep green hexane solution was transferred to a 5-liter distilling flask. Removal of hexane to a pot temperature of 105° C. under vacuum (with water aspirator) yielded 1794 grams of crude methoxydienone (I). The latter was pyrolyzed by heating to a maximum temperature of 265° C. over 3½ hours, by which time gas evolution had virtually ceased. The pyrolysate was cooled under nitrogen and was then distilled on a 1" x 48" Vigreaux column at 135–160° C./10 mm. to yield 1343 grams of a deep red distillate. The residual black tar weighed 79 grams. The warm distillate was dissolved in 1200 milliliters of methanol. The hot solution was diluted with 100 milliliters of water and crystallization allowed to proceed as the solution cooled to room temperature. After standing overnight, the crystals were collected, washed with two portions of 78.5 volume percent aqueous methanol, and dried to yield 908 grams of almost colorless tiny crystals of 2,6-di-t-butyl-4-methoxyphenol (III), melting point 99°–103° C.

Recovery of products from the mother liquor by fine fractionation and analyses by gas chromatography and infrared indicated the presence of the following in the mother liquor:

| | Grams |
|---|---|
| 2,6-di-t-butyl-4-methoxyphenol (III) | 66.0 |
| 2-t-butyl-4-methoxyphenol (II) | 78.0 |
| 2,4-di-t-butylphenol | 83.5 |
| 2,4,6-tri-t-butylphenol (V) | 88.5 |

Several by-products were also isolated but not immediately identified.

The total yield of 2,6-di-t-butyl-4-methoxyphenol (III) was 65.8 percent of theory based on charged tri-t-butylphenol.

(C) Compound (I) may also be made and then, without separation, be converted by a combination of pyrolysis and catalytic debutylation to phenolic antioxidants, as follows:

A 12-liter reaction flask was fitted with a heavy-duty air turbine-driven stirrer, a thermometer, dropping funnel, and efficient reflux condenser vented to a water bubbler. The flask was charged with 1590 grams of powdered 2,4,6-tri-t-butylphenol (V), 702 grams of powdered anhydrous $Na_2CO_3$, and 3000 milliliters of reagent methanol. To the stirred slurry were added 979 grams of bromine over a period of 109 minutes at 20°–30° C. with moderate cooling. Gas evolution was steady throughout the bromine addition, but ceased abruptly when the indicated amount of bromine had been charged. The reaction mixture was then slowly heated until gas evolution almost ceased at reflux (65°–69° C.); then for one additional hour.

The hot mixture was treated with 1800 milliliters of cold water and 750 milliliters of toluene. Phase separation took place reasonably well at 55° C. and the lower aqueous phase and precipitated salts were drained (5057 grams). The oil phase was then washed twice with one-liter portions of hot water. Recovered aqueous phases measured 1075 milliliters and 1055 milliliters. A small interface emulsion phase was separated and extracted with 30 milliliters of toluene.

The toluene phases were transferred to a 5-liter, 3-necked flask fitted with stirrer, thermometer, and a simple one-plate distillation head with provision for partial take-off of distillate. The system was vented to a wet-test meter. Distillation was then carried out at atmospheric pressure to remove toluene and water. The distillate which was collected to a pot temperature of 169° C. contained 98.4% light ends and toluene. A second distillate fraction, 250 grams and containing 85.3% toluene and light ends and 13% methoxy-dienone, was removed under partial reflux over an 18-minute period with the pot temperature rising to 221° C. During the final 80 minutes of the pyrolysis, the pot temperature was raised to 248° C. and 47.8 grams of distillate collected which contained 45% dienone and 13% 2,6-di-t-butyl-4-methoxyphenol. Gas evolution was steady, particularly above 225° C., but almost ceased during the final 10 minutes of heating. Gas volume was 4.38 cubic feet under room conditions.

The pyrolysate was cooled slowly to 160° C. and 30 grams of aluminum isopropoxide was added and heating resumed to a pot temperature of 195° C. gas evolution was very slow. Therefore, the mixture was again cooled to 160° C. and 30 grams of aluminum isopropoxide and 5 grams of aluminum flakes were added. On being reheated, the reaction mixture evolved isobutylene at a reasonably fast rate at 230°–225° C. Isopropyl alcohol which formed was allowed to distill from the flask so that refluxing would not prevent the temperature from rising. The debutylation was carried out over a 100-minute period and the rate of gas generation actually increased as the reaction proceeded although the temperature dropped from a maximum 255° C. to 235° C. when the reaction was stopped. The rate increase was attributed to an increasing concentration of phenolic aluminum salts during the run. The reaction mixture was cooled after a total of 9.69 cubic feet of gas had been generated.

To the resulting mixture was added 200 milliliters of toluene and 280 milliliters of 10% aqueous $H_2SO_4$. Phase separation was very poor, even after the addition of 200 milliliters of hot water. However, addition of 250 milliliters of 6 N aqueous hydrochloric acid dissolved suspended solids and permitted a fast, sharp phase separation. Most, if not all, of the aluminum flakes which had been added during the debutylation were recovered unchanged. The organic phase was washed twice with 250-milliliter portions of water. Finally, the oil phase was treated with 50 milliliters of 10% aqueous sodium carbonate to render the mixture basic and was transferred to a distilling flask containing four pellets of NaOH.

The product was fractionated with a 1″ x 48″ Cannon-packed column at 50 mm. Hg. Analysis by gas chromatography gave the following results:

| Product | Weight (grams) | Yield* |
|---|---|---|
| 2-t-butyl-4-methoxyphenol (II) | 352 | 32.3 |
| 4-methoxyphenol | 123 | 16.4 |
| 2,6-di-t-butyl-4-methoxyphenol (III) | 186 | 13.0 |
| 4-t-butylphenol | 50.6 | 5.5 |
| 2,4,-di-t-butylphenol | 68.3 | 5.5 |
| Unknown volatiles | 40.8 | |
| Residue (including salts) | 52.0 | |

*Percent of theory based on charged tri-t-butylphenol.

All distillate cuts above toluene in boiling point were yellow to amber in color. The 2-t-butyl-4-methoxyphenol was recovered in 98+% purity by fractionation alone.

According to the provisions of the patent statutes, I have explained the principle, preferred construction and mode of operation of my invention and have illustrated and described what I now consider to represent its best embodiment. However, I desire to have it understood that, within the scope of the appended claims, the invention may be practiced otherwise than as specifically illustrated.

I claim:

1. The method of making 2,4,6-tri-t-butyl-4-methoxy-cyclohexa-2,5-dien-1-one which comprises reacting 2,4,6-tri-t-butylphenol, bromine, methanol and an alkali metal carbonate at a temperature between 20 and 80° C.

2. The method according to claim 1 in which at least stoichiometric amounts of each of the reactants are employed.

3. The method according to claim 2 in which the alkali metal carbonate is sodium carbonate.

4. The method according to claim 3 in which the bomine is added to the mixture of the other three reactants.

5. The method of making 2,4,6-tri-t-butyl-4-methoxy-cyclohexa-2,5-dien-1-one which comprises mixing 2,4,6-tri-t-butylphenol and an alkali metal carbonate in methanol to form a slurry, stirring the slurry while bromine is added at a rate which permits maintenance of the temperature between 20 and 80° C., there being 1.0 to 1.2 moles of the carbonate per mole of 2,4,6-tri-t-butylphenol and at least that much methanol present in the slurry as well as at least that much bromine added, and holding the mixture at a temperature between 20 and 80° C. to complete the reaction.

6. The method according to claim 5 in which the carbonate is sodium carbonate.

References Cited
UNITED STATES PATENTS 2,908,692  10/1959  Richert _____ 260—396

OTHER REFERENCES

Yohe et al.: J. Org. Chemistry, vol. 21, pp. 1289–1292, 1956.

LORRAINE A. WEINBERGER, Primary Examiner

V. GARNER, Assistant Examiner

U.S. Cl. X.R.

260—613 D, 624 E

PO-1050
(5/69)

UNITED STATES PATENT OFFICE
CERTIFICATE OF CORRECTION

Patent No. 3,631,185      Dated December 28, 1971

Inventor(s) Robert J. Laufer

It is certified that error appears in the above-identified patent and that said Letters Patent are hereby corrected as shown below:

| | |
|---|---|
| In the Abstract: (Right side of formula) | "t-C$_3$H$_9$" should read -- t-C$_4$H$_9$ --; |
| Col. 1, line 45 (lower right portion of formula) | That portion of the formula that reads "CCH$_3$" should read -- OCH$_3$ --; |
| Col. 2, line 6: (left side of first benzene ring) | That portion of the formula that reads "t-C$_4$H$_7$" should read -- t-C$_4$H$_9$ --; |
| Col. 3, line 52: | "2,3-di-t-butylphenol" should read -- 2,4-di-t-butylphenol --; |
| Col. 5, line 10: | "fast rate at 230°-225°C." should read --fast rate at 230°-255°C.--. |

Signed and sealed this 17th day of October 1972.

(SEAL)
Attest:

EDWARD M. FLETCHER, JR.      ROBERT GOTTSCHALK
Attesting Officer      Commissioner of Patents